US009654623B1

(12) United States Patent
Kolazhi et al.

(10) Patent No.: US 9,654,623 B1
(45) Date of Patent: May 16, 2017

(54) DATA AGGREGATION SERVICE

(71) Applicant: Amazon Technologies, Inc., Seattle, WA (US)

(72) Inventors: Krishnan Ananthanarayanan Kolazhi, Bellevue, WA (US); Purbesh Sahoo, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 41 days.

(21) Appl. No.: 14/635,780

(22) Filed: Mar. 2, 2015

(51) Int. Cl.
H04M 3/42 (2006.01)
H04M 7/00 (2006.01)
G06F 15/16 (2006.01)
H04M 3/51 (2006.01)

(52) U.S. Cl.
CPC ......... H04M 3/42059 (2013.01); H04M 3/51 (2013.01); H04M 2201/54 (2013.01); H04M 2203/55 (2013.01)

(58) Field of Classification Search
CPC ......... H04M 1/27455; H04M 2201/42; H04M 2207/12; H04M 3/42; H04M 3/4228; H04M 3/42144; H04M 3/42153; H04M 3/42229; H04M 3/42314; H04M 3/42323; H04M 3/436; H04M 3/4931; H04M 7/0057; H04Q 3/0029; H04Q 3/0054
USPC ............ 379/201.01, 201.02, 201.03, 201.04
See application file for complete search history.

(56) References Cited

U.S. PATENT DOCUMENTS

| 6,788,775 B1* | 9/2004 | Simpson | H04M 3/382 379/201.03 |
| 8,837,700 B2* | 9/2014 | Rais | G06F 9/50 379/196 |
| 2002/0099691 A1* | 7/2002 | Lore | G06F 17/30324 |
| 2003/0200307 A1* | 10/2003 | Raju | G06F 12/1483 709/224 |
| 2011/0026703 A1* | 2/2011 | Kohlmarz-Von-Kohout | H04L 29/12028 379/216.01 |
| 2012/0233490 A1* | 9/2012 | Barton | H04L 67/1095 713/503 |
| 2014/0040505 A1* | 2/2014 | Barton | H04L 67/1095 709/248 |
| 2014/0189069 A1* | 7/2014 | Gero | H04L 67/2842 709/219 |

* cited by examiner

Primary Examiner — Khai N Nguyen
(74) Attorney, Agent, or Firm — Lee & Hayes, PLLC

(57) ABSTRACT

A data aggregation service is configured to minimize the number of service calls made to network services. The data aggregation service might be configured to cache objects returned in response to service calls to network services in a shared data object. A hash of the input values in the service calls to the network services may be utilized to determine whether an object referenced by the cache can be utilized instead of making another service call. The data aggregation service might also be configured to utilize change tracking to determine when calls are to be made to dependent services. The data aggregation service might also be configured to utilize data-specific time to live ("TTL") values, to allow network services to specify the data they are interested in at a granular level, and/or to perform automated optimization of TTL values. Other optimizations might also be implemented by the data aggregation service.

20 Claims, 6 Drawing Sheets

DATA AGGREGATION SERVICE

BACKGROUND

In certain scenarios, a single network service might call multiple other network services in order to obtain various types of data. The network service may then aggregate the various types of data received from the other network services in order to create a single object. In scenarios such as these, there are frequently inefficiencies that result in multiple redundant service calls being made to the same network service for the same data. These redundant service calls can increase the amount of time required to update the object and to provide the updated object to consuming services. Additionally, these redundant service calls can also increase the total cost of ownership ("TCO") of the network services that provide the data.

It is with respect to these and other considerations that the disclosure made herein is presented.

DETAILED DESCRIPTION

Figure 1:
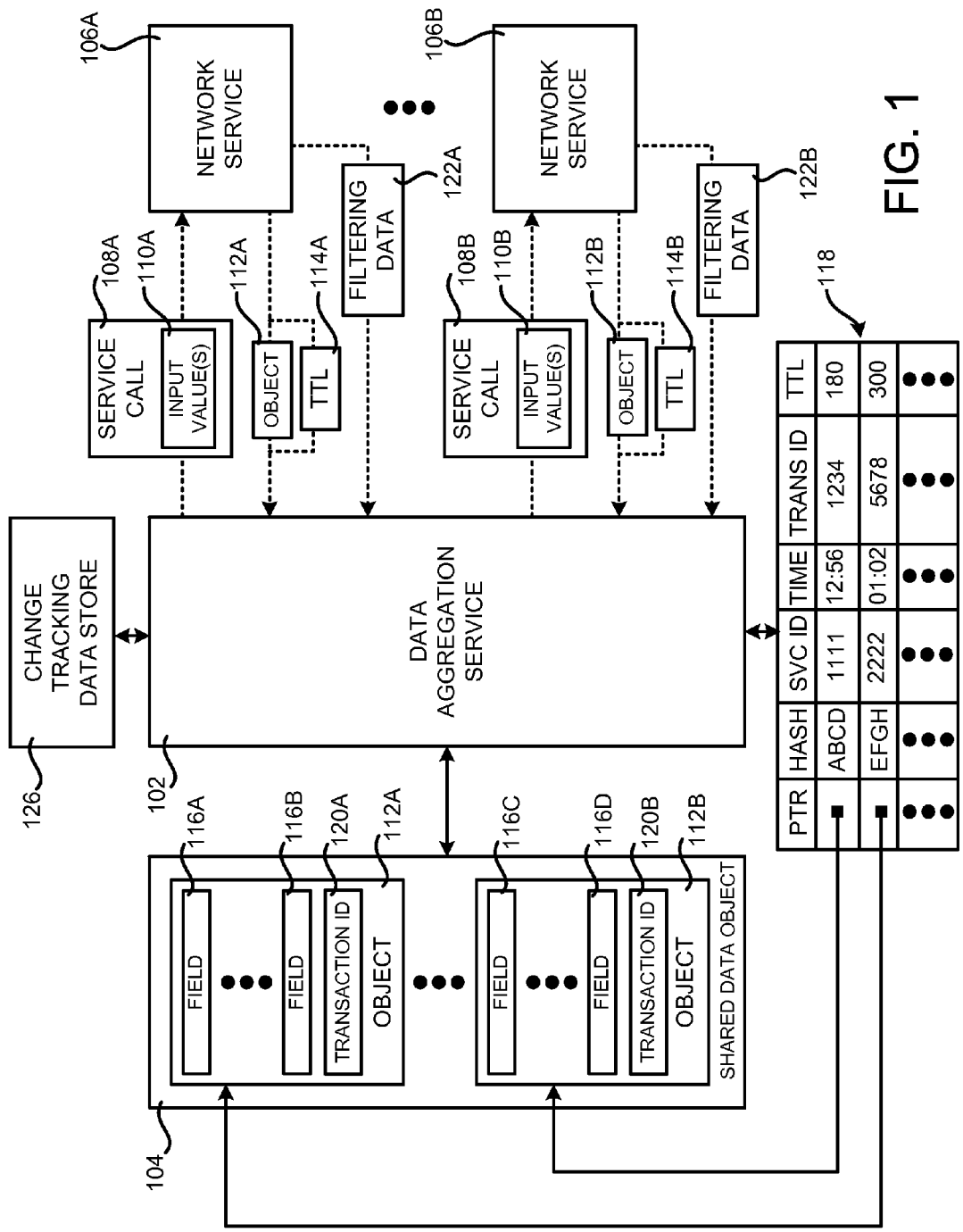
FIG. 1 is a system diagram illustrating various aspects of the operation of a data aggregation service disclosed herein.

The following detailed description is directed to technologies for providing an optimized data aggregation service. Through an implementation of the concepts and technologies disclosed herein, a data aggregation service can be provided that implements various mechanisms for optimizing aspects of its operation. An implementation of these mechanisms might result in fewer calls to network services, might reduce latency, and might further reduce the TCO of the network services from which the data aggregation service acquires data. Other benefits might also be realized through an implementation of the various technologies disclosed herein.

In one configuration presented herein, a data aggregation service is provided that is configured to generate, maintain, update, and provide a shared data object. The data aggregation service may obtain the data (which might be referred to herein as "objects") that is stored in the shared data object from a number of network services (which might also be referred to herein as "plug-ins"). For example, and without limitation, the data aggregation service might make network service calls that contain one or more input values to the network services. In response thereto, the network services perform various types of processing and return objects for inclusion in the shared data object. Other network services might make requests for some or all of the data stored in the shared data object.

The objects stored in the shared data object might have various interdependencies, such that the modification of one or more fields in one object in the shared data object might require one or more other objects to be updated. In order to update the objects in the shared data object, the data aggregation service may make another network service call to the appropriate network services. In some situations, however, the data provided as input to a network service has not changed and, therefore, the response returned by the network service is also not likely to have changed. In this scenario, a network service call might be made to the network service unnecessarily, thereby increasing latency and, potentially, also increasing the TCO of the network service. In various configurations disclosed herein, the data aggregation service utilizes several different mechanisms in order to reduce or eliminate unnecessary network service calls to the network services. Other mechanisms might also be implemented in order to optimize the communication between the data aggregation service and the network services that it calls.

One mechanism that the data aggregation service might implement to reduce or eliminate unnecessary network service calls involves caching data in the shared data object itself. In this configuration, the data aggregation service makes a first service call to one or more network services. As discussed briefly above, the network services perform various types of processing and return data objects to the data aggregation service. In turn, the data aggregation service stores the objects in the shared data object. In one configuration, the network services also return time to live ("TTL") values for the returned objects. The TTL values define the amount of time that is permitted to elapse before the data aggregation service is to call a network service for updated data.

In this configuration, the data aggregation service also maintains a cache that includes entries corresponding to service calls made by the data aggregation service. Each entry includes a referential pointer to the object stored in the shared data object that was returned by the network service call. Each entry also includes a cryptographic hash of the set (i.e. one or more) of input values provided to the network service in the service call. Each entry also includes an identifier ("ID") for the called service, the time the network service call was made, a unique transaction ID, and the TTL value returned by the network service. The unique transaction ID might also be stored in the shared data object with the object returned by the service call.

If the data aggregation service determines that it may be necessary to call a network service once again, the data aggregation service identifies the set of input values for the new call to the network service and generates a cryptographic hash value from the set of input values. The data aggregation service then determines whether there is an entry in the cache for the network service having a matching hash value. If such an entry exists, the data aggregation service determines whether the TTL specified by the network service has elapsed. If the TTL has not elapsed, the data aggregation service might also determine whether the transaction ID in the cache matches the transaction ID in the object referenced by the cache entry. If the transaction ID matches, then the object previously returned by the network service stored in the shared data object can be utilized rather than calling the network service once again.

If there is no entry in the cache with a matching hash of the input values, if the TTL value has expired, or if the transaction IDs do not match, the data aggregation service may make another call to the network service and create a new entry in the cache in the manner described above. In this way, unnecessary calls to network services by the data aggregation service might be avoided.

Another mechanism that the data aggregation service may utilize to avoid unnecessary calls to network services involves the use of change tracking. In this configuration, the data aggregation service is configured to track changes to objects in the shared data object. When the data aggregation service determines that it may be necessary to call a network service, the data aggregation service determines whether the data in the shared data object that was used as input to the network service has changed since a previous call to the network service. If the data has not changed, the data aggregation service will not make an additional service call to the network service. The caching mechanism and the change tracking mechanism described above may be utilized in combination in some configurations.

The data aggregation service might also utilize a filtering mechanism in order to perform caching on a more granular level and to make communication with the network services more efficient. In this mechanism, the network services provide filtering data to the data aggregation service that describes the specific data from the shared data object that they utilize. The data aggregation service will only call network services a subsequent time if the data specified by the network services has changed. Additionally, the filtering data may be utilized to minimize the amount of data sent to a network service in a network service call.

In some configurations, the data aggregation service is also configured to provided functionality for dynamic optimization of the TTL values provided by the network services. In these configurations, the data aggregation service may periodically obtain data from both a network service and the cache if present. The data aggregation service may then compare the data received from the network service and the data retrieved from the cache. If the data in the cache is different from the data received from the network service (i.e. a cache miss has occurred), the data aggregation service may provide an indication to the network service. The network service can then utilize the indication to adjust the TTL values that it supplies to the data aggregation service. For example, and without limitation, if the TTL value for data returned by a network service has not yet expired but data in the cache does not match the data provided by the network service, the network service might lower the TTL value. Other types of adjustments to the TTL value might also be made based upon cache hit data and cache miss data provided from the data aggregation service to the network services.

It should be appreciated that the technologies disclosed herein may be utilized in conjunction with software components and hardware devices that provide e-commerce functionality. For example, the technologies disclosed herein might be utilized with an online shopping module that provides a Web site for online shopping. The online shopping module may be configured to maintain and utilize an item catalog data store (an "item catalog") that stores records for items available for purchase through the Web site. The Web site may also provide functionality for browsing and searching for Web pages corresponding to items in the item catalog, for purchasing the items, and for performing other functions. The technologies disclosed herein might also be utilized with other types of e-commerce systems.

When the data aggregation service is utilized in conjunction with an online shopping module, such as that described above, the shared data object may be utilized to store data associated with a customer purchase. For example, and without limitation, the objects in the shared data object may correspond to items to be purchased by the customer, payment information, customer information such as a billing or delivery address, and/or other types of information relating to a purchase. In this configuration, the network services may be configured to provide the various types of information about the purchase for storage in the shared data object. For example, and without limitation, one network service might be utilized to provide a customer's shipping address, another network service might be configured to provide information about the items to be purchased, and other services might compute the sales tax for the purchase, the shipping cost, and/or the total purchase price for the purchase. Data returned by the network services may be stored in the shared data object in the manner described above. The data aggregation service may also provide functionality for permitting network services to retrieve and/or modify this data. Additional details regarding these and other aspects of the various technologies disclosed herein will be provided below with regard to FIGS. 1-6.

It should be appreciated that the configurations disclosed herein might be utilized with any type of computer, computing system, device, merchant site, application program, operating system, or other type of system or component. It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a system diagram illustrating various aspects of the operation of a data aggregation service 102 disclosed herein. As shown in FIG. 1 and described briefly above, a data aggregation service 102 is provided that is configured to generate, maintain, update, and provide a shared data object 104. As also described briefly above, the data aggregation service 102 might be utilized in conjunction with software components and hardware devices that provide e-commerce functionality in one particular configuration. For example, and without limitation, the technologies disclosed herein might be utilized with an online shopping module (not shown in FIG. 1) that provides a Web site or other type of site for online shopping. The online shopping module may be configured to maintain and utilize an item catalog data store (an "item catalog") that stores records for items available for purchase through the Web site. The Web site may also provide functionality for browsing and searching for Web pages corresponding to items in the item catalog, for purchasing the items, and for performing other functions. The technologies disclosed herein might also be utilized with other types of e-commerce systems. In this regard, it should be appreciated that the configurations disclosed herein are not limited to use by e-commerce systems and may be utilized to optimize the process of data aggregation in other technical environments.

When the data aggregation service 102 is utilized in conjunction with an online shopping module, such as that described above, the shared data object 104 may be utilized to store data associated with a customer purchase. For example, and without limitation, objects 112 in the shared data object 104 may correspond to items to be purchased by the customer, payment information, customer information such as a billing or delivery address, and/or other types of information relating to a purchase.

As shown in FIG. 1, the data aggregation service 102 may obtain the objects 112 stored in the shared data object 104 from a number of network services 106. For example, and without limitation, the data aggregation service 102 might make network service calls 108 that contain one or more input values 110 to the network services 106. In response thereto, the network services 106 perform various types of processing and return objects 112 for inclusion in the shared data object 104. Other network services 106 might make requests for some or all of the data stored in the shared data object 104.

When utilized in conjunction with an e-commerce system, the network services 106 may be configured to provide the various types of information about a customer purchase for storage in the shared data object 104 and use by other network services. For example, and without limitation, one network service 106A might be utilized to provide an object 112A that includes a customer's shipping address, while another network service 106B might be configured to provide an object 112B that includes information about the items to be purchased. Other services 106 might compute the sales tax for the purchase, the shipping cost, and/or the total purchase price for the purchase, and return objects 112 to the data aggregation service 102 containing this information. Other services 106 might provide other types of data. Data objects 112 returned by the network services 106 may be stored in the shared data object 104. The data aggregation service 102 might also provide functionality for permitting network services 106 to retrieve and/or modify this data.

As described briefly above, the objects 112 stored in the shared data object 104 might have various interdependencies, such that the modification of one or more objects 112 or one or more fields 116 in an object 112 in the shared data object 104 might require one or more other objects 112 or fields 116 to be updated. For example, if a new object 112 is added to the shared data object 104 for a new item to be purchased by a customer, network service calls 108 may need to be made to services 106 for updating objects 112 in the shared data object 104 storing data regarding the total order price, the shipping cost, whether free shipping is available, and/or other types of information. Other types of service calls 108 might need to be made based upon other changes or additions to objects 112 and/or fields 116 in objects 112 in the shared data object 104.

As discussed just above, in order to update an object 112 in the shared data object 104, the data aggregation service 102 may make one or more other network service calls 108 to the appropriate network services 106. In some situations, however, little time has passed since the previous call and/or the input values 110 to a network service 106 have not changed since the previous call to the network service 106 and, therefore, the data in the object 112 returned by the network service 106 is not likely to have changed. For example, if the items in a customer purchase from an e-commerce merchant have not changed, then there would likely be no change to the shipping cost for the items (unless another object 112 was changed that might impact the shipping cost, such as the shipping address). In this scenario, a network service call 108 might be made to a network service 106 unnecessarily, thereby increasing latency and, potentially, also increasing the TCO of the network service. This may be particularly true when there are a large number of objects in the shared data object 104 and/or when there are a large number of network services 106 to be called.

In the configurations disclosed herein, the data aggregation service 102 utilizes various mechanisms in order to reduce or eliminate unnecessary network service calls 108 to the network services 106. Other mechanisms might also be implemented in order to optimize the communication between the data aggregation service 102 and the network services 106 that it calls. Some of these mechanisms are described in detail below.

One mechanism that the data aggregation service 102 might implement to reduce or eliminate unnecessary network service calls 108 involves caching objects 112 received from the network services 106 in the shared data object 104. In this configuration, the data aggregation service 102 makes a first service call 108 to a network service 106, such as the network service 106A. As discussed above, the network service 106 will perform its processing and return one or more objects 112A to the data aggregation service 102 in response to the service call 108A. In turn, the data aggregation service 102 stores the returned object 112A in the shared data object 104. In one configuration, the network service 106A also returns a TTL value 114A for the returned object 112A. The TTL value defines the amount of time that is permitted to elapse before the data aggregation service 102 is to call the network service 106A for an updated object 112A.

In this configuration, the data aggregation service 102 also maintains a cache 118 that includes entries corresponding to service calls 108 made by the data aggregation service 102. Each entry in the cache 118 includes a referential pointer to the object 112 stored in the shared data object 104 that was returned by the network service call 108. For instance, in the example shown in FIG. 1, a service call 108A was made to the network service 106A with input values 110A. In response thereto, the network service 106A returned the object 112A and the TTL value 114A. The object 112A is stored in the shared data object 104. A referential pointer from an entry in the cache 118 points to the object 112A in the shared data object 104. Similarly, a service call 108B was made to the network service 106B with input values 110B. In response thereto, the network service 106B returned the object 112B and the TTL value 114B. The object 112B is stored in the shared data object 104. A referential pointer from an entry in the cache 118 points to the object 112B in the shared data object 104.

Each entry in the cache 118 also includes a cryptographic hash of the input values 110 provided to the network services 106 in the service calls 108. In the example shown in FIG. 1, for instance, the cache 118 includes a hash of "ABCD" of the input values 110A and a hash of "EFGH" for the input values 110B. Each entry in the cache 118 also includes an identifier ("ID") for the corresponding service 106, the time the network service call 108 was made, a unique transaction ID 120, and the TTL value 114 returned by the network service 106. The unique transaction ID 120 is a value that is unique for each service call 108.

As shown in FIG. 1, the unique transaction ID 120 might also be stored in the shared data object 104 with the object 112 returned by the service call 108. In the example shown in FIG. 1, for instance, the transaction ID 120A of "1234" is associated with the service call 108A and is stored in both the cache 118 and the object 112A in the shared data object 104. Similarly, the transaction ID 120B of "5678" is associated with the service call 108B and is stored in both the cache 118 and the object 112B in the shared data object 104. Details regarding the use of the transaction ID 120 will be provided below.

As mentioned above, changes to the data stored in the shared data object 104, or another type of stimulus, might cause the data aggregation service 102 to determine that a second or subsequent call to a network service 106 is required. In response to such a determination, the data aggregation service 102 identifies the input values 110 for the second or subsequent call to the network service 106 and generates a cryptographic hash of the input values 110 using the same hashing algorithm utilized to hash the input values 110 in the previous request. The data aggregation service 102 then determines whether there is an entry in the cache 118 for the network service 106 that has a matching hash value. If such an entry exists in the cache 118, the data aggregation service 102 might also determine whether the TTL value 114 specified by the network service 106 has expired. This determination may be made based upon the TTL value 114 and the time of the previous call to the network service 106, which is also stored in the cache 118. If the TTL value 114 has not expired, the data aggregation service 102 might also determine whether the transaction ID 120 in the cache 118 matches the transaction ID 120 in the object 112 referenced by the cache entry. If the transaction ID 120 matches, then the object 112 previously returned by the network service 106 that is stored in the shared data object 104 can be utilized rather than calling the network service 106 once again.

If, however, there is no entry in the cache 118 with a matching hash of the input values 110, if the TTL has expired, or if the transaction IDs 120 do not match, the data aggregation service 102 may make another call to the network service 106 and create a new entry in the cache 118 in the manner described above. Older entries in the cache 118 may also be purged. In this way, unnecessary network service calls 108 to network services 106 by the data aggregation service 102 might be avoided. Additional details regarding this process are provided below with regard to FIG. 2.

Another mechanism that the data aggregation service 102 may utilize to avoid unnecessary network service calls 108 to network services 106 involves the use of change tracking. In this configuration, the data aggregation service 102 is configured to track changes to objects 112 in the shared data object 104. For example, and without limitation, the data aggregation service 102 might maintain a change tracking data store 126 that includes data identifying the changes to the various objects 112 in the shared data object 104. When the data aggregation service 102 determines that a second or subsequent call to a network service 106 might be necessary (e.g. as a result of the modification of data in the shared data object 104), the data aggregation service 102 determines whether the data in the shared data object 104 that is used as inputs (i.e. the input values 110) to the network service 106 has changed since the previous network service call 108 to the network service 106. If the values for the input parameters have not changed, the data aggregation service 102 will not make an additional network service call 108 to the network service 102. Additional details regarding this process are provided below with respect to FIG. 3.

It should be appreciated that the caching mechanism and the change tracking mechanism described above can be utilized in combination in some configurations. The change tracking mechanism may be useful to avoid unnecessary network service calls 108 for objects 112 for which all changes are tracked by the data aggregation service 102 without the need to compute hash values. There may be certain types of objects 112, however, for which changes can be made without the knowledge of the data aggregation service 102. The caching mechanism described above may be useful for eliminating unnecessary network service calls 108 for these types of objects 112.

The data aggregation service 102 might also utilize a filtering mechanism in order to perform caching on a more granular level than the object level, and to make communication with the network services 106 more efficient. In this mechanism, the network services 106 are configured to provide filtering data 122 to the data aggregation service 102. The filtering data 122 describes the specific data from the shared data object 102 that each network service 106 utilizes. For example, and without limitation, the network service 106A might provide filtering data 122A to the data aggregation service 102 indicating that it should only be called if the fields 116A or 116B of the object 112A change. Similarly, the network service 106B might provide filtering data 122B to the data aggregation service 102 indicating that it is to be called only if the field 116D of the object 112B changes.

Using the filtering data 122, the data aggregation service 102 will only call network services 106 a second or subsequent time if the data specified by the network services 106 in the filtering data 122 has changed (and the associated TTL has not elapsed). Additionally, the data aggregation service may utilize the filtering data 122 in order to minimize the amount of data sent to a network service 106 in a network service call 108. For example, only fields 116 or objects 112 specified in the filtering data 122 may be provided to the network services 106 as input values 110. Additional details regarding this aspect will be provided below with regard to FIG. 4.

In some configurations, the data aggregation service 102 is also configured to provide functionality for dynamic optimization of the TTL values 114 provided by the network services 108. In these configurations, the data aggregation service 102 may periodically perform network service calls 108 to the network services 106, even where the caching mechanism described above indicates that a call is not to be made to the network service 106 (i.e. a cache hit). The data aggregation service 102 may then compare the data received from the network service 108 in response to the network service call 108 and the data retrieved from the cache (i.e. the data stored in the shared data object 104).

If the cached data is different from the data received from the network service 108 (i.e. a cache miss has occurred), the data aggregation service 102 may provide an indication to the network service 106. The network service 102 can then utilize the indication to adjust the TTL values 114 that it supplies to the data aggregation service 102. For example, and without limitation, if the TTL value 114 for data returned by a network service 106 has not yet expired but the cached data does not match the data provided by the network service 106, the network service 106 might lower the TTL value 114. Other types of data indicating cache misses and cache hits might be provided to the network services 106. Additionally, other types of adjustments to the TTL values 114 might also be made based upon cache hit data and cache miss data provided from the data aggregation service 102 to the network services 106. Additional details regarding this aspect will be provided below with regard to FIG. 5.

Figure 2:
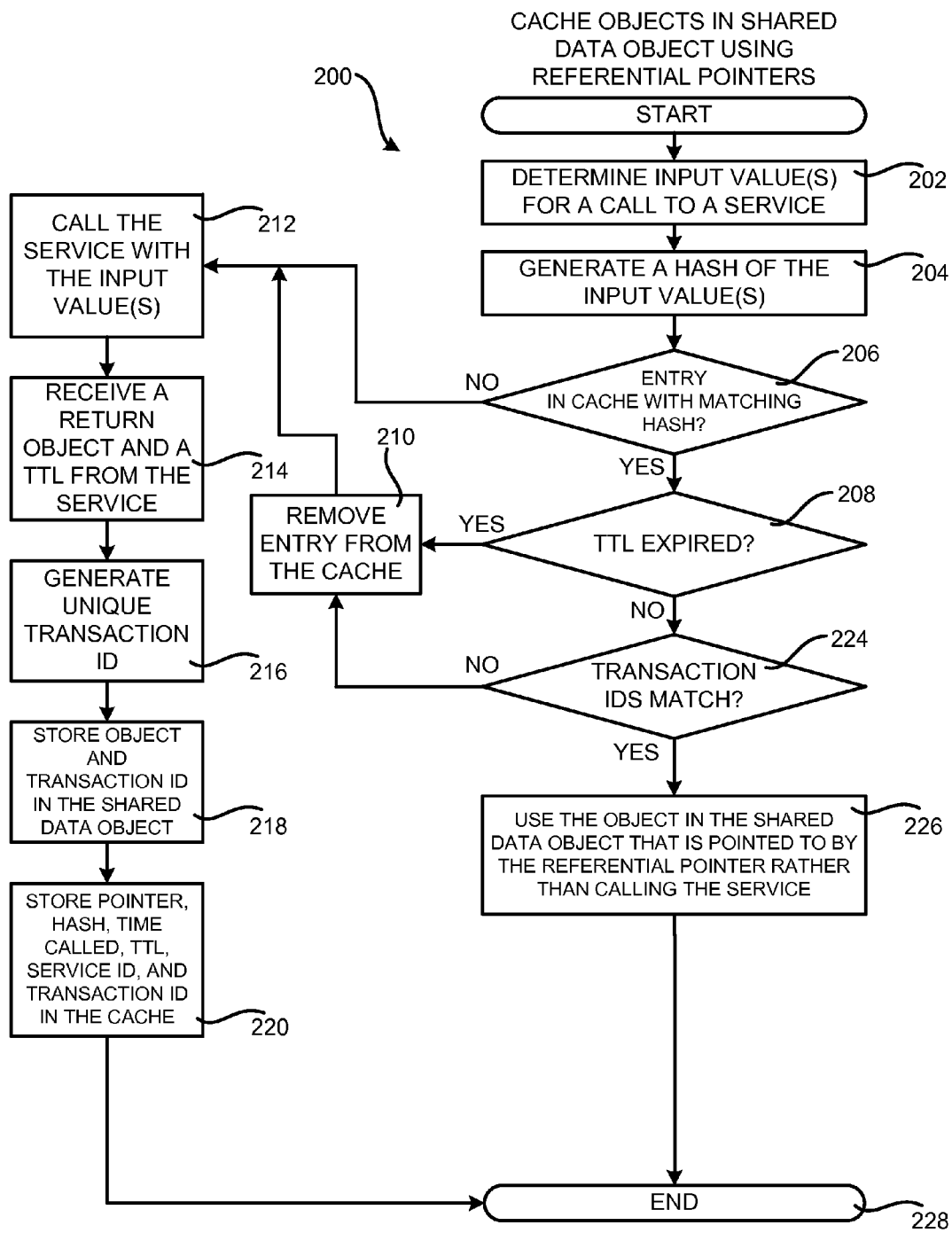
FIG. 2 is a flow diagram showing aspects of one illustrative routine for optimizing the operation of a data aggregation service by caching objects in a shared data object using referential pointers.

Turning now to FIG. 2, additional details will be provided regarding the operation of the data aggregation service 102. In particular, FIG. 2 is a flow diagram showing aspects of one illustrative routine 200 for caching objects 112 in the shared data object 104 using referential pointers stored in the cache 118. As discussed briefly above, and in greater detail below, the data aggregation service 102 might utilize the mechanism shown in FIG. 2 in order to reduce the number of service calls 108 to the network services 106. The reduced number of service calls 108 might also result in a lower TCO for the network services 106. As also discussed above, the mechanism illustrated in FIG. 2 might be triggered in response to a determination by the data aggregation service 102 that a call to a service 106 might be necessary. For example, and without limitation, a change to an object 112 in the shared data object 104 that is used as an input by the network service 106 might trigger the processing illustrated in FIG. 2. An initial service call (i.e. the first) to a network service 106 might also be performed using the mechanism shown in FIG. 1.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 200 begins at operation 202, where the data aggregation service 102 determines the input values 110 that are to be provided in the call to the network service 106. Once the input values 110 have been identified, the routine 200 proceeds from operation 202 to operation 204, where the data aggregation service 102 generates a cryptographic hash of the input values 110. Any suitable hashing algorithm may be utilized. Once the hash value has been generated, the routine 200 proceeds from operation 204 to operation 206.

It should be appreciated that while a hash computation is described at operation 204, other types of transformations of the input values 110 might be performed and the resulting values stored in the cache 118. For example, a mathematical, cryptographic, and/or Boolean transformation of the input values 110 might be performed The same transformation might also later be performed at the time another network service call is to be performed, and the results of the transformations compared in order to determine whether a cached object (i.e. an object previously stored in the shared data object 104 and referenced by an entry in the cache 118) is to be utilized. In other configurations, the actual input values 110 are stored in the cache 118 and compared to the actual input values for the subsequent service call. Performing a hash of the input values or another type of transformation may, however, permit a smaller amount of data to be stored in the cache 118, particularly where the size of the input values 110 are large.

At operation 206, the data aggregation service 102 determines whether there is an entry in the cache 118 for the destination service 106 that includes a matching hash of the input values 110. If no matching entry exists in the cache 118, the routine 200 proceeds from operation 206 to operation 212, where the network service 106 may be called and a new entry created in the cache. If, however, a matching entry is located in the cache 118, the routine 200 proceeds from operation 206 to operation 208.

At operation 208, the data aggregation service 102 determines if the TTL value 114 for the entry with the matching hash value in the cache 118 has expired. As discussed above, this may be determined using the TTL value 114 in the cache 118 and the time that the network service 106 was last called, which is also stored in the cache 118. If the TTL has expired, the routine 200 proceeds from operation 208 to operation 210, where the entry in the cache 118 with the matching hash value may be removed from the cache 118. The routine 200 may then proceed from operation 210 to operation 212, where the destination network service 106 may be called.

If, however, at operation 208, the data aggregation service 102 determines that the TTL has not expired, the routine 200 proceeds from operation 208 to operation 224. At operation 224, the data aggregation service 102 determines whether the transaction ID in the entry in the cache 118 matches the transaction ID in the referenced object 112 in the shared data object 104. If the transaction IDs do not match, the routine 200 proceeds from operation 224 to operation 210, where the entry in the cache 118 may be removed. Removing the cache entry from the cache 118 when the transaction IDs do not match avoids the case where a write operation to the cache 118 succeeds and a write operation to the shared data object 104 fails, or vice versa. In this regard, it should be appreciated that the entire cache (i.e. all of the objects in the shared data object 104) might be considered invalid in response to identifying mismatching transaction IDs 120A and 120 in some configurations.

If the data aggregation service 102 determines that the transaction IDs match at operation 224, the routine 200 proceeds from operation 224 to operation 226. At operation 226, the object 112 stored in the shared data object 104 that is referenced by the entry in the cache 118 with the matching hash values is utilized rather than making a second or subsequent call to the network service 106. The routine 200 then proceeds from operation 226 to operation 228, where it ends.

As discussed above, the routine 200 may proceed from operations 206 and 210 to operation 212. At operation 212, the data aggregation service 102 calls a network service 106 with input values 110. The routine 200 then proceeds from operation 212 to operation 214, where the data aggregation service 102 receives at least one object 112 from the called network service 106 in response to the request. As discussed above, the data aggregation service 102 might also receive a TTL value 114 from the called network service 106 in some configurations.

From operation 214, the routine 200 proceeds from operation 214 to operation 216, where the data aggregation service 102 generate a unique transaction ID for the service call. Once the transaction ID has been generated, the routine 200 proceeds from operation 216 to operation 218, where the data aggregation service 102 stores the object 112 received from the service call 108 and the associated transaction ID in the shared data object 104.

From operation 218, the routine 200 proceeds from operation 218 to operation 220, where the data aggregation service 102 creates an entry in the cache 118 that includes a pointer to the returned object 112 in the shared data object 104 in the cache 118. The entry also includes the hash of the input values 110, the service ID, the time the network service 106 was called (i.e. at operation 212), the transaction ID generated at operation 216, and the TTL value 114 returned from the network service 106. The routine 200 then proceeds from operation 220 to operation 228, where it ends.

Figure 3:
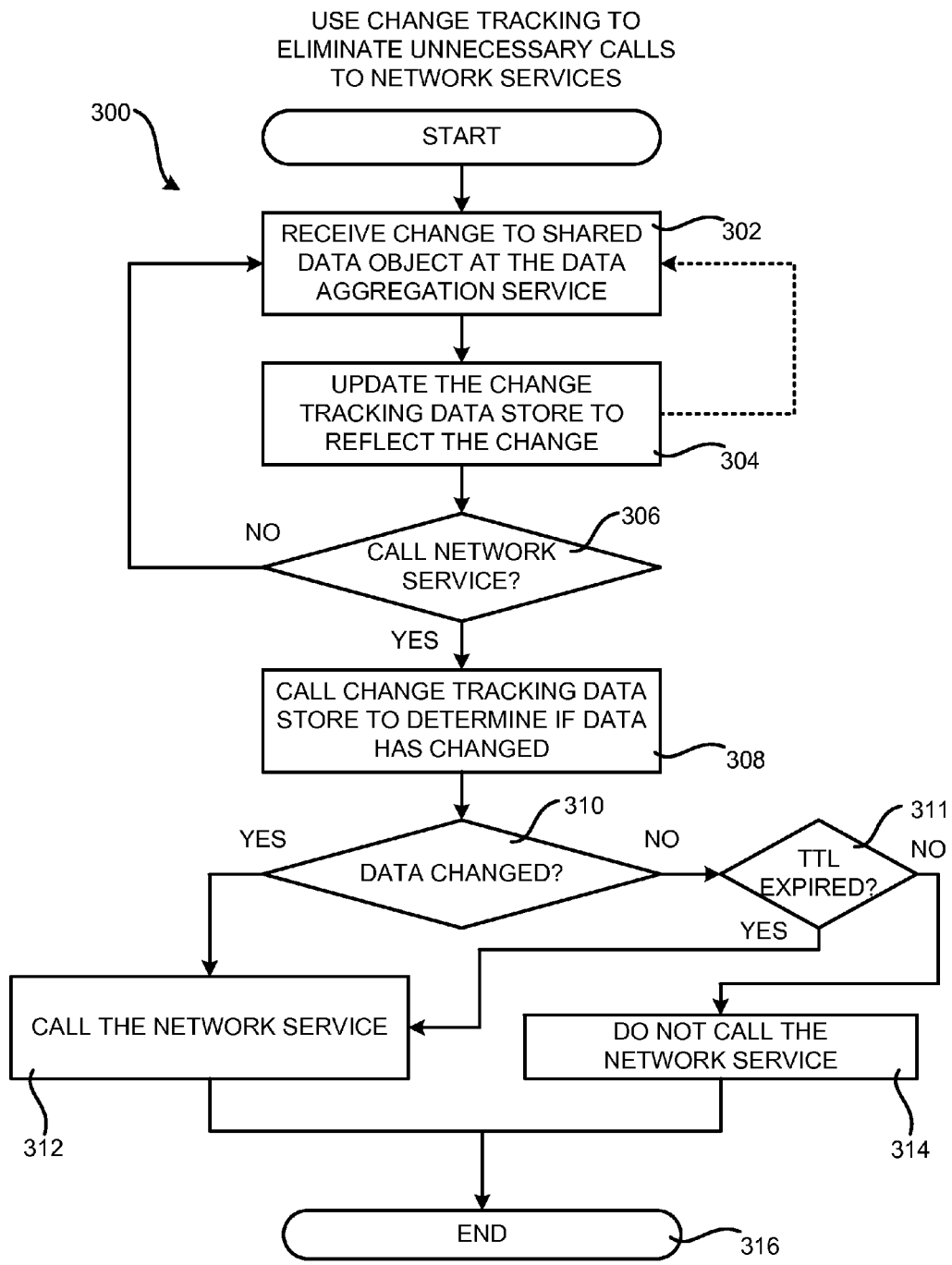
FIG. 3 is a flow diagram showing aspects of one illustrative routine for optimizing the operation of a data aggregation service by utilizing change tracking to eliminate unnecessary service calls to network services.

FIG. 3 is a flow diagram showing aspects of one illustrative routine 300 for optimizing the operation of the data aggregation service 102 by utilizing change tracking to eliminate unnecessary service calls 108 to the network services 106. As discussed above, the change tracking mechanism might be utilized independently or in combination with the mechanism shown in FIG. 2 in some configurations.

The routine 300 begins at operation 302, where the data aggregation service 102 receives changes to objects 112 and/or fields 116 in objects 112 in the shared data object 104. In response thereto, the routine 300 proceeds from operation 302 to operation 304, where the data aggregation service 102 updates the change tracking data store 126 to reflect the modifications. As illustrated by the dashed line in FIG. 3, this process may continue repeatedly so that the data aggregation service 102 continually monitors changes and generates data that reflects the changes to the shared data object 104.

From operation 304, the routine 300 proceeds to operation 306, where the data aggregation service 102 determines that a network service call 108 to a network service 106 may be required (e.g. in response to a change to the shared data object 104). If a network service call 108 may be required, the routine 300 proceeds from operation 306 to operation 308. At operation 308, the data aggregation service 102 calls the change tracking data store 126 to determine if the objects 112 or fields 116 in the shared data object 104 that will form the input values 110 to the service 106 to be called have changed since the previous call to the network service 106. If the data stored in the change tracking data store 126 indicates that the input values 110 have not changed, the routine 300 proceeds from operation 310 to operation 314, where a second or subsequent call to the network service 106 will not be placed. If, however, the data stored in the change tracking data store 126 indicates that the input values 110 have changed, the routine 300 proceeds from operation 310 to operation 312, where the data aggregation service 102 calls the network service 106. The routine 300 proceeds from operations 312 to operation 314, where it ends.

Figure 4:
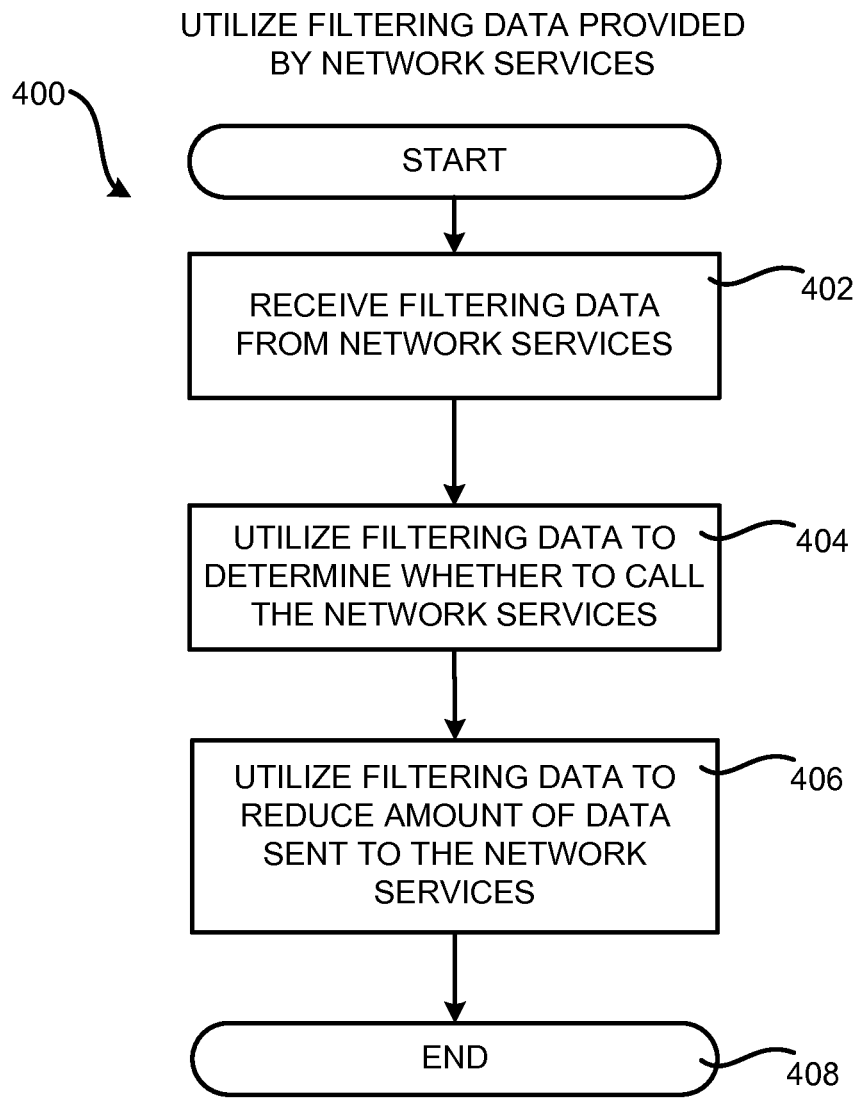
FIG. 4 is a flow diagram showing aspects of one illustrative routine for optimizing the operation of a data aggregation service by utilizing filtering data to reduce the amount of data sent to one or more network services.

FIG. 4 is a flow diagram showing aspects of one illustrative routine 400 for optimizing the operation of the data aggregation service 102 by utilizing filtering data to reduce the amount of data sent to the more network services 106. The routine 400 begins at operation 402, where the data aggregation service 102 receives the filtering data 122 from one or more of the network services 106. As discussed briefly above, the filtering data 122 describes the specific objects 112 and/or fields 116 from the shared data object 102 that each network service 106 utilizes. In the example shown in FIG. 1, for instance, the network service 106A might provide filtering data 122A to the data aggregation service 102 indicating that it utilizes the fields 116A and 116B of the object 112A. Similarly, the network service 106B might provide filtering data 122B to the data aggregation service 102 indicating that it utilizes the field 116D of the object 112B. From operation 402, the routine 400 proceeds to operation 404.

At operation 404, the data aggregation service 102 utilizes the filtering data 122 to determine whether to call a particular network service 106. For example, the data aggregation service 102 might determine whether the objects 112 or fields 116 specified in the filtering data 122 have changed since the previous call to a network service 106 using the mechanism described above. If the objects 112 or fields 116 have not changed since the previous call within the TTL specified by the network service 106, no network service call will be made to the network service 106A. If, however, the objects 112 or fields 116 have changed, then the network service call 108 will be made to the network service 106. Using the filtering data 122 in this manner, the data aggregation service 102 will only call network services 106 a second or subsequent time if the data specified by the network services 106 in the filtering data 122 has changed.

From operation 406, the routine 400 proceeds to operation 406, where the data aggregation service 102 might utilize the filtering data 122 to reduce the amount of data sent to a network service 106 in a network service call 108. For example, only fields 116 or objects 112 specified in the filtering data 122 may be provided to the network services 106 as input values 110. From operation 406, the routine 400 proceeds to operation 408, where it ends.

Figure 5:
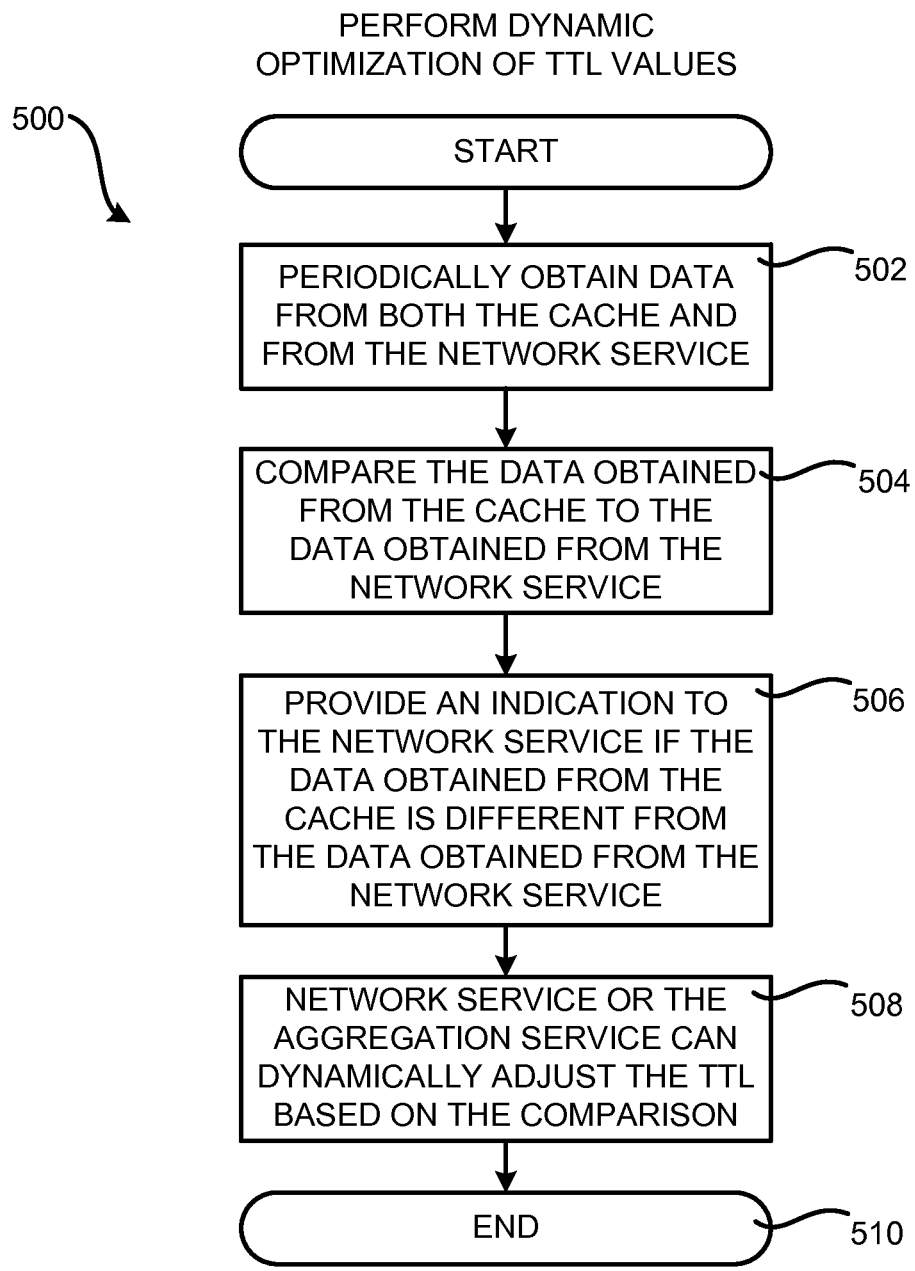
FIG. 5 is a flow diagram showing aspects of one illustrative routine for performing dynamic optimization of time to live values that are utilized when caching the results of calls to network services.

FIG. 5 is a flow diagram showing aspects of one illustrative routine 500 for performing dynamic optimization of TTL values 114 that are utilized when caching the results of service calls 108 to the network services 106. The routine 500 begins at operation 502, where the data aggregation service 102 periodically obtains data from both the shared data object 104 and from the network service 106 that provided the data. For example, and without limitation, that data aggregation service 102 might perform a network service call 108 to the network service 106 to obtain an object 112, even where the caching mechanism described above indicates that a call is not to be made to the network service 106 (i.e. a cache hit).

From operation 502, the routine 500 proceeds to operation 504, where the data aggregation service 102 may compare the data received from the network service 108 in response to the network service call 108 and the data retrieved from the cache (i.e. the data stored in the shared data object 104). If the cached data is different from the data received from the network service 108 (i.e. a cache miss has occurred), the data aggregation service 102 may provide data to the network service 106 at operation 506 indicating that the cache miss occurred in some configurations.

The network service 102 can then utilize the provided indication at operation 508 to adjust the TTL value 114 that it supplies to the data aggregation service 102. For example, and without limitation, if the TTL value 114 for data returned by a network service 106 has not yet expired but the cached data does not match the data provided by the network service 106, the network service 106 might lower the TTL value 114. Other types of data indicating cache misses and cache hits might be provided to the network services 106. Additionally, other types of adjustments to the TTL values 114 might also be made based upon cache hit data and cache miss data provided from the data aggregation service 102 to the network services 106.

In some configurations, the data aggregation service 102 itself may adjust the TTL values stored in the cache 118. For example, and without limitation, the data aggregation service 102 and the network services 106 might have a service level agreement ("SLA") value that defines the percentage of time that cache hits are to occur. If the actual level of cache hits falls below the agree-upon SLA value, the data aggregation service 102 might adjust the TTL values utilized for the network services 106 in an attempt to satisfy the SLA. As discussed above, the network services 106 might similarly utilize the cache hit and cache miss data provided by the data aggregation service 102 to adjust their own TTL values 114 in an attempt to meet the agreed-upon SLA. In some configurations, a network service might also be configured to provide a GUI or other type of interface for allowing a user to specify the TTL 114 for a particular service. The GUI or other type of interface might also indicate the TCO savings or cost associated with a particular TTL value. Other types of information might also be provided and other types of information might be presented in such a GUI or other type of interface in other configurations. From operation 508, the routine 500 proceeds to operation 510, where it ends.

It should be appreciated that, in some configurations, the network services 106 might also specify to the data aggregation service 102 the granularity of the data in the shared data object 104 that is to be provided to the network service 106 following a change to the objects 112 in the shared data object 104. Using this mechanism, the data aggregation service 102 might provide only a subset of the objects 120 to a network service 106 or might provide all of the objects 120 to the network service 120 in the event of a cache miss. The network service 106 can provide preferences indicating the granularity (i.e. all or some subset) at which the objects 112 are to be provided. Other preferences regarding the manner in which the data aggregation service 102 calls the network services 106 might also be provided in other configurations.

Figure 6:
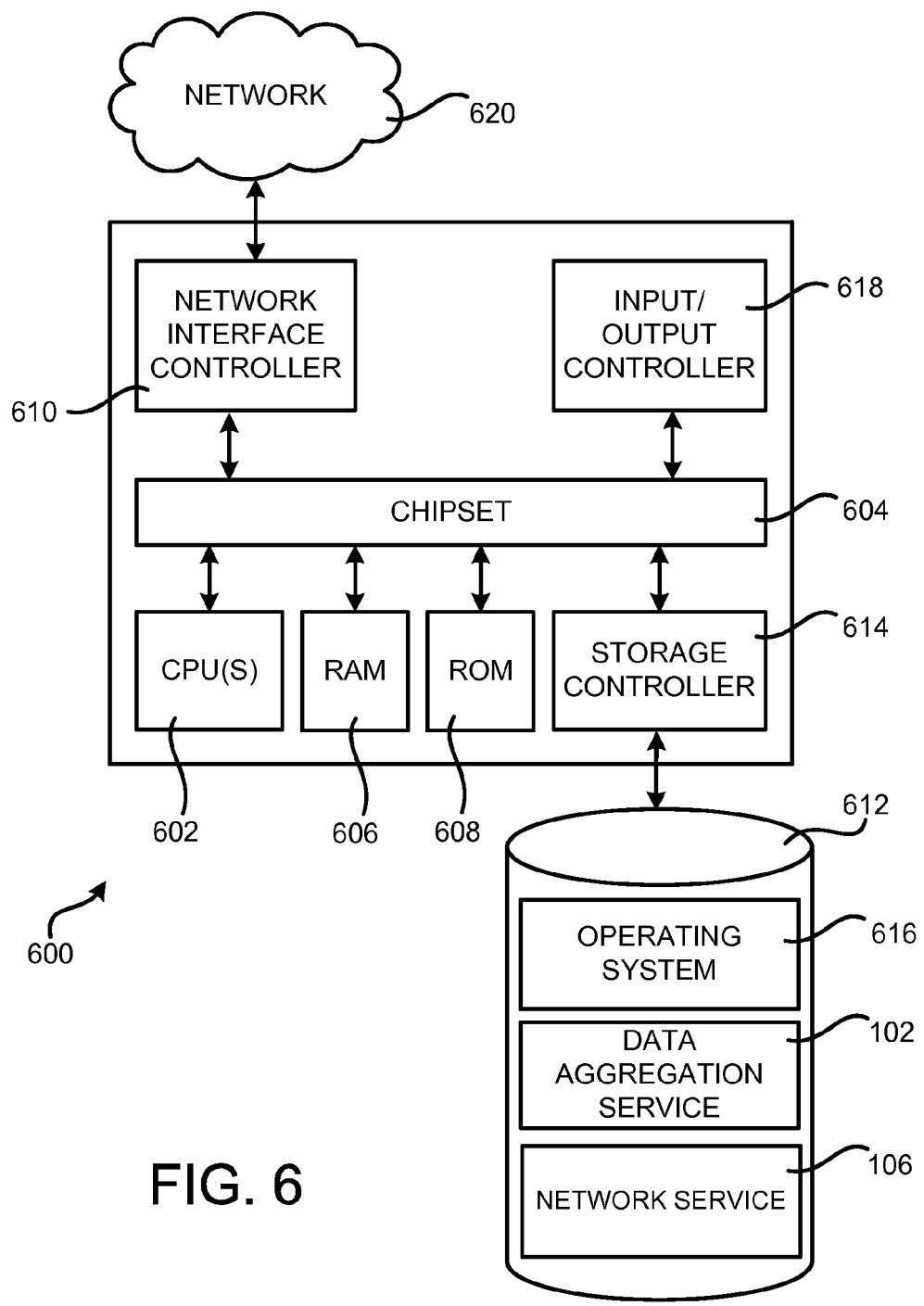
FIG. 6 is a computer architecture diagram showing one illustrative computer hardware architecture for use in computing devices configured to implement the concepts and technologies disclosed herein in one particular configuration.

FIG. 6 shows an example computer architecture for a computer 600 capable of executing the software components described herein for providing an optimized data aggregation service 102 in the manner presented above. The computer architecture shown in FIG. 6 illustrates a conventional server computer, workstation, desktop computer, laptop, electronic book reader, digital wireless phone, tablet computer, network appliance, set-top box, or other computing device. The computer architecture shown in FIG. 6 may be utilized to execute the various software components described above.

The computer 600 includes a baseboard, or "motherboard," which is a printed circuit board to which a multitude of components or devices may be connected by way of a system bus or other electrical communication paths. In one illustrative configuration, one or more central processing units ("CPUs") 602 operate in conjunction with a chipset 604. The CPUs 602 are standard programmable processors that perform arithmetic and logical operations necessary for the operation of the computer 600.

The CPUs 602 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 604 provides an interface between the CPUs 602 and the remainder of the components and devices on the baseboard. The chipset 604 may provide an interface to a random access memory ("RAM") 606, used as the main memory in the computer 600. The chipset 604 may further provide an interface to a computer-readable storage medium such as a read-only memory ("ROM") 608 or non-volatile RAM ("NVRAM") for storing basic routines that that help to startup the computer 600 and to transfer information between the various components and devices. The ROM 608 or NVRAM may also store other software components necessary for the operation of the computer 600 in accordance with the configurations described herein.

In one configuration, the computer 600 operates in a networked environment using logical connections to remote computing devices and computer systems through a network, such as a local-area network ("LAN"), a wide-area network ("WAN"), the Internet, or any other networking topology known in the art that connects the computer 600 to remote computers. The chipset 604 includes functionality for providing network connectivity through a network interface controller ("NIC") 610, such as a gigabit Ethernet adapter. It should be appreciated that multiple NICs 610 may be present in the computer 600, connecting the computer 600 to other types of networks and remote computer systems.

The computer 600 may be connected to a mass storage device 612 that provides non-volatile storage for the computer. The mass storage device 612 may store system programs, application programs, other program modules, and data, which have been described in greater detail herein. The mass storage device 612 may be connected to the computer 600 through a storage controller 614 connected to the chipset 604. The mass storage device 612 may consist of one or more physical storage units. The storage controller 614 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 600 may store data on the mass storage device 612 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 612 is characterized as primary or secondary storage, or the like.

For example, the computer 600 may store information to the mass storage device 612 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 612 by detecting the physical states or characteristics of one or more particular locations within the physical storage units.

In addition to the mass storage device 612 described above, the computer 600 might have access to other computer-readable media to store and retrieve information, such as program modules, data structures, or other data. It should be appreciated by those skilled in the art that computer-readable media can be any available media that may be accessed by the computer 600, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 612 may store an operating system 616 utilized to control the operation of the computer 600. In one configuration, the operating system comprises the LINUX operating system. In another configuration, the operating system comprises the WINDOWS® SERVER operating system from MICROSOFT Corporation of Redmond, Wash. In yet another configuration, the operating system may comprise the UNIX operating system. It should be appreciated that other operating systems may also be utilized. The mass storage device 612 may store other system or application programs and data utilized by the computer 600. For instance, the mass storage device may store the data aggregation service 102 and one or more network services 106, both of which were described in detail above.

In one configuration, the mass storage device 612 or other computer-readable storage media is encoded with computer-executable instructions which, when loaded into the computer 600, transform the computer from a general-purpose computing system into a special-purpose computer capable of implementing the technologies described herein. These computer-executable instructions transform the computer 600 by specifying how the CPUs 602 transition between states, as described above. According to one configuration, the computer 600 has access to computer-readable storage media storing computer-executable instructions that, when executed by the computer, perform the various routines and operations described herein.

The computer 600 may also include an input/output controller 618 for receiving and processing input from a number of input devices, such as a keyboard, a mouse, a touchpad, a touch screen, an electronic stylus, or other type of input device. Similarly, the input/output controller 618 may provide output to a display device, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for providing an optimized data aggregation service 102 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method performed by one or more processors, the computer-implemented method comprising:
    making a first network service call to a network service, the first network service call comprising a first set of input values;
    receiving a response to the network service call, the response comprising at least one object;
    storing the at least one object in a shared data object;
    storing a pointer to the at least one object, a hash of the first set of input values, a time that the first network service call was made, and a time to live ("TTL") value for the at least one object in a cache;
    determining whether a second network service call comprising a second set of input values is to be made to the network service by
        computing a hash of the second set of input values,
        determining whether the hash of the first set of input values matches the hash of the second set of input values, and
        determining whether the TTL value has expired based on the time that the first network service call was made and the TTL value; and
    performing the second network service call if the hash of the first set of input values does not match the hash of the second set of input values or if the TTL value has expired.

2. The computer-implemented method of claim 1, further comprising:
    storing a unique transaction identifier (ID) for the first network service call in the cache;
    storing the unique transaction ID for the first network service call in the shared data object; and performing the second network service call if the unique transaction ID stored in the cache does not match the unique transaction ID stored in the shared data object.

3. The computer-implemented method of claim 1, wherein the response to the network service call further comprises the TTL value for the at least one object.

4. The computer-implemented method of claim 1, further comprising:
maintaining data indicating whether the shared data object has changed following the first network service call to the network service; and
determining whether to perform the second service call based, at least in part, on the data indicating whether the shared data object has changed.

5. The computer-implemented method of claim 1, wherein the network service is further configured to provide filtering data identifying one or more objects in the shared data object or one more or more fields in one or more objects in the shared data object.

6. The computer-implemented method of claim 5, further comprising determining whether to perform the second service call based, at least in part, upon a determination as to whether the one or more objects or fields identified in the filtering data have changed following the first network service call to the network service.

7. The computer-implemented method of claim 1, further comprising optimizing the TTL value based upon cache hit data or cache miss data and a service level agreement value.

8. A non-transitory computer-readable storage medium having computer-executable instructions stored thereupon which, when executed by the computer, cause the computer to:
maintain a cache storing a pointer to an object in a shared data object, a first hash of a first set of input values provided in a first network service call to a network service that generated the object, and a time to live (TTL) for the object;
compute a second hash of a second set of input values associated with a second network service call;
determine whether the first hash matches the second hash;
determine whether the TTL for the object has elapsed; and
perform the second network service call to the network service if the first hash does not match the second hash or if the TTL for the object has not elapsed.

9. The non-transitory computer-readable storage medium of claim 8, having further computer-executable instructions stored thereupon to:
store an identifier (ID) for the first network service call in the cache;
store the ID in the shared data object; and
perform the second network service call to the network service if the ID stored in the cache does not match the ID stored in the shared data object.

10. The non-transitory computer-readable storage medium of claim 8, wherein the network service provides the TTL.

11. The non-transitory computer-readable storage medium of claim 8, having further computer-executable instructions stored thereupon to:
maintain data indicating whether the shared data object has changed following the first network service call; and
determine whether to perform the second network service call to the network service based, at least in part, on the data indicating whether the shared data object has changed.

12. The non-transitory computer-readable storage medium of claim 8, wherein the network service is further configured to specify a granularity indicating all or a subset of the one or more objects of the shared data object that are to be provided to the network service with the second network service call.

13. The non-transitory computer-readable storage medium of claim 12, having further computer-executable instructions stored thereupon to determine whether to perform the second service call based, at least in part, upon a determination as to whether the one or more objects or fields identified in filtering data have changed following the first network service call to the network service.

14. The non-transitory computer-readable storage medium of claim 8, having further computer-executable instructions stored thereupon to generate cache hit data or cache miss data for use in optimizing the TTL.

15. An apparatus, comprising:
at least one processor; and
a non-transitory computer-readable storage medium having computer-executable instructions stored thereon which, when executed on the at least one processor, cause the apparatus to
maintain a cache storing a pointer to an object in a shared data object and a transformed set of first input values, the first input values provided in a first network service call to a network service that generated the object,
compute a transformed set of second input values, the second input values associated with a second network service call,
determine whether the transformed set of first input values matches the transformed set of second input values, and
perform the second network service call to the network service if the transformed set of first input values does not match the transformed set of second input values.

16. The apparatus of claim 15, wherein the cache further stores a time to live (TTL) value for the object that is received from the network service, and wherein the second network service call is performed if the TTL for the object has elapsed.

17. The apparatus of claim 15, wherein a unique identifier (ID) for the first network service call is stored in the cache, wherein the unique ID is stored in the shared data object, and wherein the second network service call is performed if the unique ID stored in the cache does not match the unique ID stored in the shared data object.

18. The apparatus of claim 15, wherein the non-transitory computer-readable storage medium has further computer-executable instructions stored thereupon to:
maintain data indicating whether the shared data object has changed following the first network service call; and
determine whether to perform the second network service call to the network service based, at least in part, on the data indicating whether the shared data object has changed.

19. The apparatus of claim 15, wherein the network service is further configured to provide filtering data identifying one or more objects or one or more fields within the shared data object, and wherein the non-transitory computer-readable storage medium has further computer-executable instructions stored thereupon to determine whether to perform the second service call based, at least in part, upon a determination as to whether the one or more objects or fields identified in the filtering data have changed following the first network service call to the network service.

20. The apparatus of claim 15, wherein the non-transitory computer-readable storage medium has further computer-executable instructions stored thereupon to generate cache hit data or cache miss data for optimizing a TTL value.

\* \* \* \* \*